US010612319B2

(12) United States Patent
Nelson et al.

(10) Patent No.: US 10,612,319 B2
(45) Date of Patent: Apr. 7, 2020

(54) RADIAL RATCHET DOG ANTI-ROTATION DEVICE

(71) Applicant: Dril-Quip, Inc., Houston, TX (US)

(72) Inventors: John E. Nelson, Houston, TX (US); Justin Rye, Houston, TX (US); Flavio E. Santos, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 63 days.

(21) Appl. No.: 15/429,618

(22) Filed: Feb. 10, 2017

(65) Prior Publication Data

US 2018/0230758 A1    Aug. 16, 2018

(51) Int. Cl.
 *E21B 17/043* (2006.01)
 *F16L 15/08* (2006.01)
(52) U.S. Cl.
 CPC ............ *E21B 17/043* (2013.01); *F16L 15/08* (2013.01)
(58) Field of Classification Search
 CPC ........ F16L 15/08; E21B 17/04; E21B 17/042; E21B 17/0423; E21B 17/0426; E21B 17/043; E21B 17/046
 See application file for complete search history.

(56) References Cited

U.S. PATENT DOCUMENTS 3,827,728 A  *  8/1974  Hynes .................... E21B 33/038
                                                 285/309
4,074,912 A  *  2/1978  Van Bilderbeek ........ E02D 7/00
                                                 285/309

(Continued)

FOREIGN PATENT DOCUMENTS

WO    WO-2012070272 A1 *  5/2012  ............ F16B 39/023

OTHER PUBLICATIONS

Merriam Webster Definition of "Integral". Available at: https://www.merriam-webster.com/dictionary/integral Accessed Mar. 13, 2019 (Year: 2019).*

*Primary Examiner* — Robert E Fuller
*Assistant Examiner* — Theodore N Yao
(74) *Attorney, Agent, or Firm* — Baker Botts L.L.P.

(57) ABSTRACT

In one embodiment, an anti-rotation system includes a first tubular member having an extended thread and a torque shoulder, the first tubular member comprising a radial recessed area, the radial recessed area located axially between the external thread and the torque shoulder of the first tubular member. The system may further include a second tubular member comprising a radial recessed slot, the radial recessed slot located in the inner circumference of the second tubular member. The system may also include a pin toothed insert mechanically coupled to the first tubular member within the recessed area, the pin toothed insert comprising a first circumferential tooth pattern facing radially outward from the first tubular member. The system may also include a spring loaded, radial ratchet dog located within the radial recessed slot, the spring loaded radial ratchet dog comprising a second circumferential tooth pattern facing radially inward from the second tubular member. The spring loaded radial ratchet dog may be movable radially outward over the pin toothed insert during coupling of the first tubular member and the second tubular member. Furthermore, the spring loaded radial ratchet dog may engage the pin toothed insert and resisting decoupling of the first tubular member and the second tubular member.

20 Claims, 9 Drawing Sheets

(56) References Cited

U.S. PATENT DOCUMENTS

| | | | | |
|---|---|---|---|---|
| 4,094,539 | A * | 6/1978 | Reimert | E02D 5/523 |
| | | | | 285/309 |
| 4,830,408 | A * | 5/1989 | Reimert | E21B 17/046 |
| | | | | 285/27 |
| 6,695,059 | B2 * | 2/2004 | Thomas | E21B 33/035 |
| | | | | 166/208 |
| 7,216,699 | B2 * | 5/2007 | Nelson | E21B 23/02 |
| | | | | 166/338 |
| 8,388,255 | B2 * | 3/2013 | Larson | E21B 19/004 |
| | | | | 285/26 |
| 2005/0258640 | A1 | 11/2005 | Otten et al. | |
| 2007/0049093 | A1 | 3/2007 | Otten et al. | |
| 2011/0214877 | A1 * | 9/2011 | Stringfellow | E21B 17/085 |
| | | | | 166/341 |
| 2014/0103645 | A1 | 4/2014 | Steen et al. | |
| 2014/0167408 | A1 * | 6/2014 | Steen | E21B 17/043 |
| | | | | 285/330 |
| 2016/0076316 | A1 * | 3/2016 | Gallagher | F16L 15/08 |
| | | | | 166/242.6 |

\* cited by examiner

RADIAL RATCHET DOG ANTI-ROTATION DEVICE

TECHNICAL FIELD

The present disclosure relates generally to connector assemblies and, more particularly, to a radial ratchet dog anti-rotation device.

BACKGROUND

Offshore oil and gas drilling operations typically include the make-up of strings of pipe or casing members, frequently of relatively large diameter. The string of tubular members may be driven into the ground underwater to be used for anchoring the drilling platform. Such strings are also used as conduits in the water through which a well may be initiated. The joint between members of such tubular strings must provide both structural strength and fluid pressure integrity. Such features of a joint might be provided, for example, by welding. However, because welding is a time-consuming operation, and drilling rig rates are high, particularly offshore, mechanical connectors are generally preferred. Typical mechanical connectors available include threaded type connectors in which tubular members are mutually rotated to thread a pin and box connector assembly, breach block connectors, and snap lock connectors.

In threaded mechanical connector assemblies an externally threaded end, known as the pin, mates with an internally threaded section, known as the box. The pin and the box on a threaded connector assembly are designed to be engaged with each other and rotated to a specific torque value for connecting the ends. A number of different pin and box configurations may be used depending on the connector size and application. After the connection is made, anti-rotation devices can be installed to secure the pin and the box together at the desired make-up torque. The anti-rotation devices are designed to ensure that the threaded portions of the connector assembly do not become tightened over the desired make-up torque or loosened from each other in response to forces applied to the pipe or casing members in the string.

Existing anti-rotation devices often feature a mechanical key that can be selectively positioned in a recess between the pin and the box of the connector assembly to prevent rotation of the pin and the box relative to each other in a certain direction once the make-up torque is reached. Unfortunately, these keys typically do not go into action to engage with the connector assembly until after the connection is loosened slightly. That is, the keys are generally first positioned in the recesses of the connector assembly, and then the pin and box are rotated slightly relative to each other to energize the key. As a result, the connection may be secured at a different torque than the initial desired make-up torque.

In addition, some existing anti-rotation keys are designed to interface very closely with the connector assembly to fill a recess therein. As such, these keys can be difficult to position in the corresponding recess and often must be hammered into engagement with the connector assembly using a large amount of force. This hammering process takes an undesirable amount of time and energy to ensure that the keys are lodged into their respective recesses in the connector assembly.

SUMMARY OF THE DISCLOSURE

In one embodiment, an anti-rotation system includes a first tubular member having an extended thread and a torque shoulder, the first tubular member comprising a radial recessed area, the radial recessed area located axially between the external thread and the torque shoulder of the first tubular member. The system may further include a second tubular member comprising a radial recessed slot, the radial recessed slot located in the inner circumference of the second tubular member. The system may also include a pin toothed insert mechanically coupled to the first tubular member within the recessed area, the pin toothed insert comprising a first circumferential tooth pattern facing radially outward from the first tubular member. The system may also include a spring loaded, radial ratchet dog located within the radial recessed slot, the spring loaded radial ratchet dog comprising a second circumferential tooth pattern facing radially inward from the second tubular member. The spring loaded radial ratchet dog may be movable radially outward over the pin toothed insert during coupling of the first tubular member and the second tubular member. Furthermore, the spring loaded radial ratchet dog may engage the pin toothed insert and resisting decoupling of the first tubular member and the second tubular member.

In an example embodiment, a method for securely coupling tubular members includes preparing a first tubular member and a second tubular member to receive a radial ratchet dog anti-rotation device. Preparing the first tubular member and the second tubular member may include forming a radial recessed area within the first tubular member and forming a radial recessed slot within the second tubular member. The method may further include assembling the radial ratchet dog anti-rotation device. Assembling the radial ratchet dog anti-rotation device may include disposing a pin toothed insert to the first tubular member within the recessed area, the pin toothed insert comprising a first circumferential tooth pattern facing radially outward from the first tubular member. Assembling the anti-rotation device may also include disposing a spring loaded, radial ratchet dog within the radial recessed slot, the spring loaded radial ratchet dog comprising a second circumferential tooth pattern facing radially inward from the second tubular member. The method may further include coupling the first tubular member and the second tubular member, wherein during coupling the spring loaded radial ratchet dog is movable radially outward over the pin toothed insert during and the spring loaded radial ratchet dog engages the pin toothed insert and resists decoupling of the first tubular member and the second tubular member.

Technical advantages of certain embodiments include housing a radial ratchet dog anti-rotation device within tubular members to minimize the risk of damaging the radial ratchet dog anti-rotation device through exposure when the male tubular member and female tubular member are decoupled. Another advantage provided by certain embodiments includes providing positive torque resistance using the radial ratchet dog by transmitting load forces through the circumferential teeth of toothed inserts. Another advantage provided by certain embodiments includes the automatic actuation of the radial ratchet dog anti-rotation device, allowing for hands free operation when the male and female tubular connectors are coupled. Another advantage of certain embodiments allows for a visual confirmation of the radial ratchet dog anti-rotation device one or more position indicators thereby reducing the need for technician intervention.

Other technical advantages will be readily apparent to one skilled in the art from FIGS. 1-8, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Certain embodiments according to the present disclosure are directed to an improved radial ratchet dog anti-rotation device designed to prevent rotation of a first tubular member of a connector assembly with respect to a second tubular member of the connector assembly. The radial ratchet dog anti-rotation device includes several features that facilitate easier, faster, and more accurate securing of the tubular members to prevent rotation of the threaded tubular members of the connector. For example, the radial ratchet dog anti-rotation device may include features that prevent decoupling once the tubular members are brought to their make-up torque.

Figure 1A:
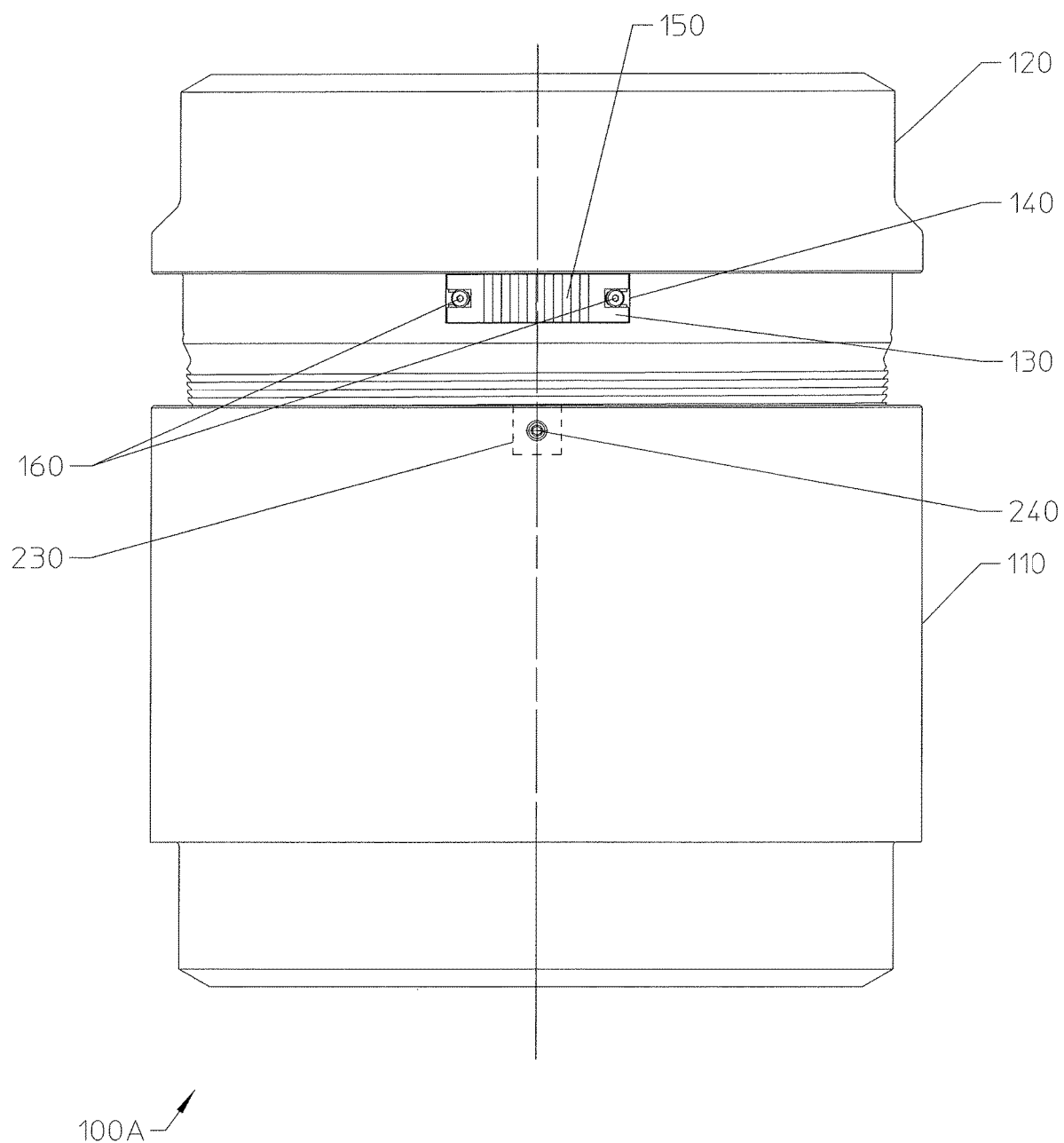
FIG. 1A illustrates a front view of a first connector assembly comprising a first embodiment of a radial ratchet dog anti-rotation device, in accordance with an embodiment of the present disclosure.

FIG. 1A illustrates a front view 100A of a first connector assembly comprising a first embodiment of a radial ratchet dog anti-rotation device. The first connector assembly comprises a female tubular member 110 and a male tubular member 120 (female tubular member 110 and male tubular member 120 may collectively be referred to as "tubular members 110 and 120"). In the illustrated embodiment, first connector assembly comprises a toothed insert 130 mechanically coupled to male tubular member 120 using insert fasteners 160. Female tubular member 110 may include a ratchet dog access hole 240 through the wall of female tubular member 110 and leading to ratchet dog insert slot 230. In certain embodiments, ratchet dog insert slot 230 is located in the inner circumference of female tubular member 110, the location of which is indicated by the dashed lines in FIG. 1A.

In an example embodiment, female tubular member 110 may have internal threads, while male tubular member 120 may have external threads. In certain applications, female tubular member 110 may be referred to as the "box" and male tubular member 120 may be referred to as the "pin." The box and pin are designed to be coupled. These tubular members may include, for example, lengths of a wire stem or large diameter casing. The pin may be formed into the first tubular component and the box is formed into the second tubular component, such that a connector assembly is integral to the tubular components being connected. In other embodiments, the pin and the box may be separate components that are attached to their respective tubular components as desired to facilitate the connection. However, the present disclosure is not limited to any specific configuration of the pin and box relative to the female tubular member 110 and the male tubular member 120 being connected.

When coupling female tubular member 110 with male tubular member 120, it is desirable to rotate tubular members 110 and 120 relative to each other until tubular members 110 and 120 reach a desired make-up torque. As tubular members 110 and 120 reach this make-up torque, one or more radial ratchet dogs 210 (illustrated in FIG. 1B) may automatically engage toothed inserts 130 to prevent tubular members 110 and 120 from decoupling out of the designated make-up torque.

Toothed insert 130 represents any suitable insert capable of engaging radial ratchet dog 210 to prevent decoupling of female tubular member 110 and male tubular member 120. Toothed insert 130 may be made of any suitable material (e.g., metal, metal alloy, plastic, composite material, etc.). Moreover, toothed insert 130 may be scalable based on the size and application of tubular members 110 and 120. For example, larger diameter tubular members 110 and 120 may require a larger toothed insert 130, while smaller diameter tubular members 110 and 120 may allow for a smaller sized toothed insert 130. In some embodiments, the length of toothed insert 130 is based on the make-up torque tolerances to ensure that radial ratchet dogs 210 fall on toothed insert 130 at both a minimum and maximum make-up torque.

Toothed insert 130 may be mechanically coupled to male tubular member 120 within a radial recessed area 140. In some embodiments, radial recessed area 140 may be located axially between an external thread of male tubular member 120 and the torque shoulder of male tubular member 120.

In the illustrated embodiment, toothed insert 130 is mechanically coupled to radial recessed area 140 using insert fasteners 160. Insert fasteners 160 represent any suitable devices operable to affix toothed insert 130 within radial recessed area 140. For example, in some embodiments insert fasteners 160 may be threaded bolts that are threaded into tapped holes within male tubular member 120 (e.g., low head cap screws). Accordingly, toothed insert 130 may be easily replaceable in the event that a different pattern is needed for insert teeth 150 or toothed insert 130 is damaged (e.g., one or more insert teeth 150 are broken or chipped).

Toothed insert 130 may comprise a plurality of insert teeth 150 facing radially outward from male tubular member 120. In some embodiments, toothed insert 130 comprises a circumferential tooth pattern that faces radially outward from male tubular member 120. Toothed insert 130 may have any suitable number of insert teeth 150. In the illustrated embodiment, the plurality of insert teeth 150 run the entire length of toothed insert 130. Toothed insert 130 may also utilize any suitable pattern for the plurality of insert teeth 150 to distribute the force created when female tubular member 110 and male tubular member 120 attempt to decouple.

In some embodiments, radial recessed area 140 and ratchet dog insert slot 230 may be milled into the walls of male tubular member 120 and female tubular member 110, respectively. In some embodiments, radial recessed area 140 and ratchet dog insert slot 230 are milled off-site and/or included in the design of female tubular member 110 and male tubular member 120. FIGS. 1B-4 provide additional detail of the interaction and location of the components that make up the radial ratchet dog anti-rotation device.

Figure 1B:
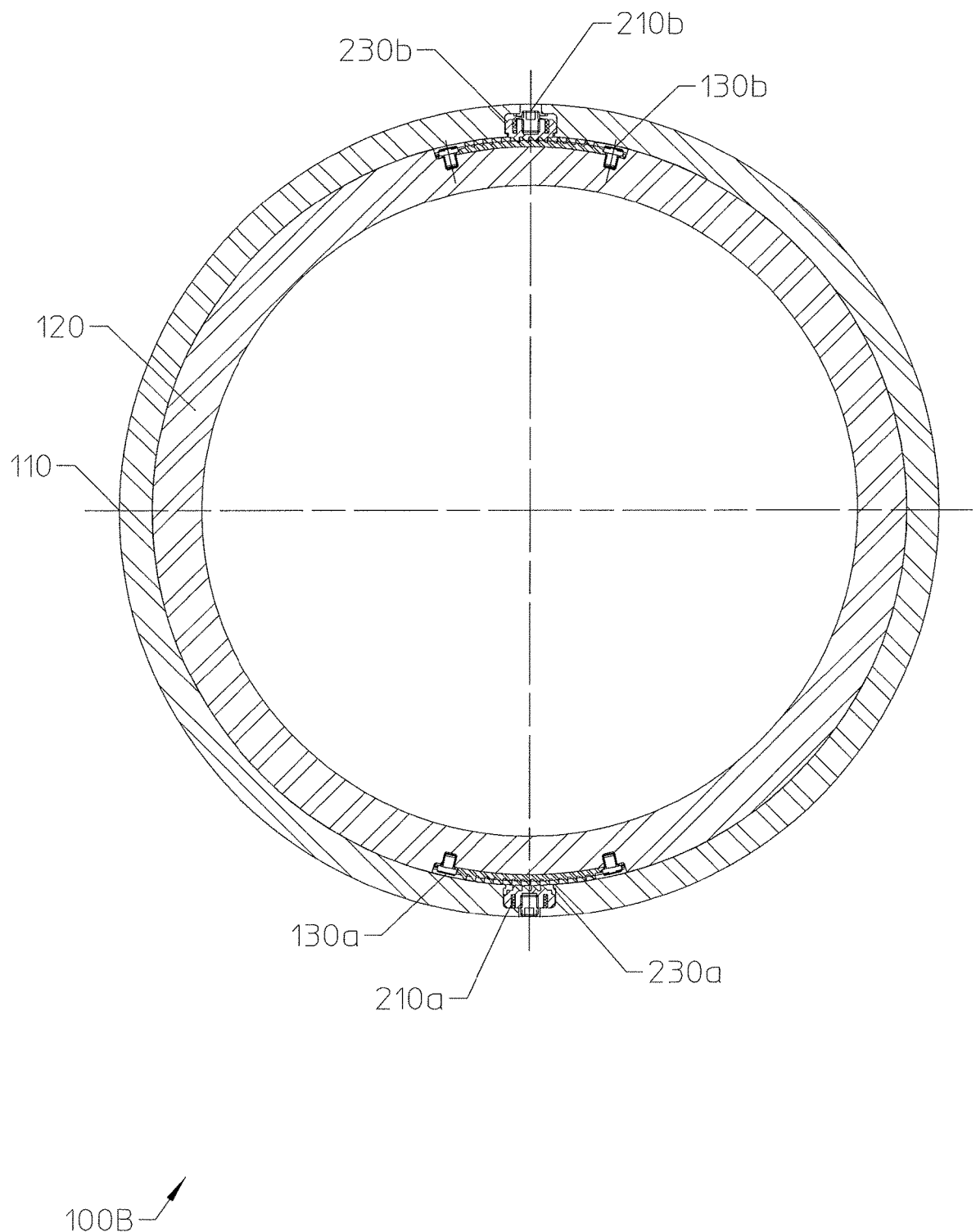
FIG. 1B illustrates a top view of a female tubular member having radial ratchet dogs housed within its inner circumference, in accordance with an embodiment of the present disclosure.

FIG. 1B illustrates a top view 100B of female tubular member 110 having radial ratchet dogs 210a and 210b (collectively "radial ratchet dogs 210") within the inner circumference of female tubular member 110. For purposes of illustration, radial ratchet dog 210a is disengaged/retracted from toothed insert 130a, while radial ratchet dog 210b is in the engaged position with toothed insert 130b.

As tubular members 110 and 120 are brought to their make-up torque, radial ratchet dogs 210 may become aligned with toothed inserts 130. As tubular members 110 and 120 are rotated, radial ratchet dogs 210 may automatically ratchet over insert teeth 150. As shown in greater detail in FIGS. 4A and 4B, once tubular members 110 and 120 reach the desired make-up torque, radial ratchet dogs 210 may engage with insert teeth 150 of toothed inserts 110 thereby resisting decoupling of tubular members 110 and 120. Moreover, although FIG. 1B shows two radial ratchet dogs 210 and two toothed inserts 130, any suitable number of radial ratchet dogs 210 and toothed inserts 130 may be used to prevent tubular members 110 and 120 from decoupling.

Figure 2:
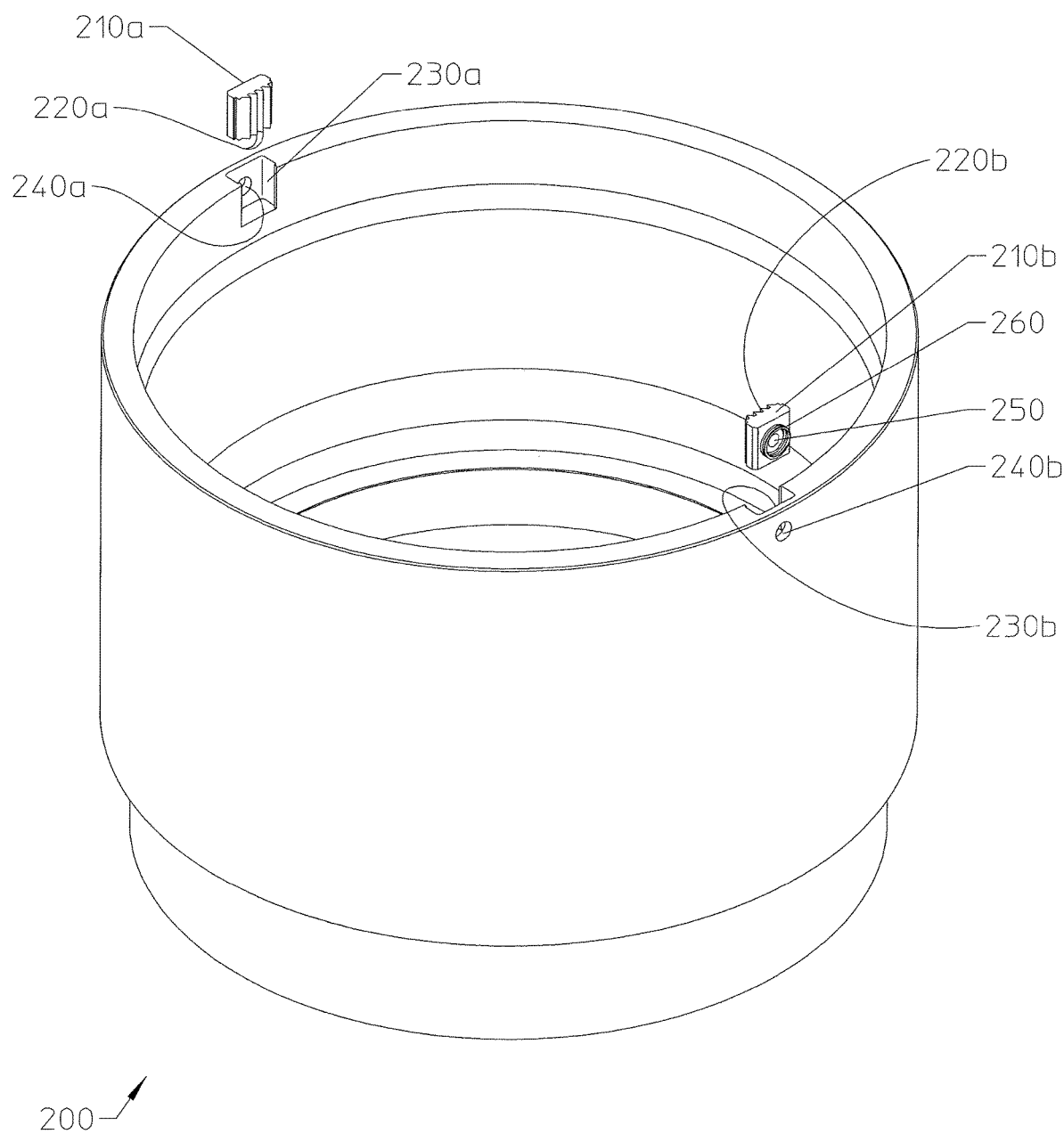
FIG. 2 illustrates an exploded front view of the female tubular member and the radial ratchet dogs, in accordance with an embodiment of the present disclosure.

FIG. 2 illustrates an exploded front view 200 of female tubular member 110 with radial ratchet dogs 210. Radial ratchet dogs 210 may be fitted into ratchet dog insert slots 230. In the illustrated embodiment, radial ratchet dogs 210 comprise ratchet dog teeth 220, ratchet dog spring 250, and ratchet dog threaded hole 260.

Radial ratchet dogs 210 represent any suitable device capable of engaging toothed inserts 130 to prevent decoupling of tubular members 110 and 120. Radial ratchet dogs 210 may be made of any suitable material (e.g., metal, metal alloy, plastic, composite material, etc.). Moreover, radial ratchet dogs 210 may be scalable based on the size and application of tubular members 110 and 120. For example, larger diameter tubular members 110 and 120 may require larger or additional radial ratchet dogs 210, while smaller diameter tubular members 110 and 120 may allow for a smaller or fewer radial ratchet dogs 210.

In the illustrated embodiment, radial ratchet dogs 210 comprise ratchet dog teeth 220. Radial ratchet dogs 210 may have any suitable number of ratchet dog teeth 220. Radial ratchet dogs 210 may also utilize any suitable pattern for the plurality of ratchet dog teeth 220 to distribute the force created when female tubular member 110 and male tubular member 120 attempt to decouple. In some embodiments, ratchet dog teeth 220 have a circumferential tooth pattern facing radially inward from female tubular member 110. Ratchet dog teeth 220 and insert teeth 150 may have a matching circumferential tooth profile with an angled leading edge that allows radial ratchet dog 210 to move radially outward when tubular members 110 and 120 are being coupled and a flat or substantially flat lagging edge that allows radial ratchet dog 210 to engage toothed insert 130 and resist un-buck toque between tubular members 110 and 120.

Radial ratchet dogs 210 may also include ratchet dog spring 250. As shown in the illustrated embodiment, ratchet dog spring 250 may be located on the opposite side of ratchet dog 210 from ratchet dog teeth 220. Ratchet dog spring 250 may press against the inner wall of ratchet dog insert slot 230, thereby inwardly biasing radial ratchet dog 210. Accordingly, in some embodiments, when coupled with ratchet dog spring 250, radial ratchet dog 210 may be referred to as a spring loaded, radial ratchet dog 210.

Ratchet dog spring 250 may utilize any suitable mechanism that allows radial ratchet dog 210 to move radially relative to female tubular member 110 when tubular members 110 and 120 are being coupled. For example, in some embodiments ratchet dog spring 250 may comprise a compression spring. In some embodiments, ratchet dog spring 250 may be mechanically coupled to radial ratchet dog 210 to centralize ratchet dog spring 250. Ratchet dog spring 250 may be sized such that ratchet dog spring 250 does not exceed its free length while stroking radially inward or its solid length while stroking radially outward.

Radial ratchet dog 210 may also include a ratchet dog threaded hole 260. As shown in the illustrated embodiment, ratchet dog threaded hole 260 may be located on the opposite side of radial ratchet dog 210 from ratchet dog teeth 220 (i.e., the same side as ratchet dog spring 250). Ratchet dog threaded hole 260 may align with ratchet dog access hole 240, thereby allowing access to ratchet dog threaded hole 260 from the outside of female tubular member 110.

Ratchet dog threaded hole 260 may be used for a number of functions. For example, in certain embodiments, a position indicator 265 may be inserted into ratchet dog threaded hole 260. Position indicator 265 (illustrated in FIGS. 4A and 4B) may be any suitable device capable of indicating the position (e.g., radial position) of radial ratchet dog 210. In some embodiments, position indicator 265 may be a set screw with an internal hex that is threaded into ratchet dog threaded hole 260. In this manner, when ratchet dog spring 250 expands to engage radial ratchet dog 210 with toothed insert 130, position indicator 265 may be positioned radially inward within female tubular member 110. When ratchet dog spring 250 compresses to retract radial ratchet dog 210 from toothed insert 130, position indicator 265 may be extended radially outward with respect to female tubular member 110. In this manner, the position of radial ratchet dog 210 may be determined based on the location of position indicator 265 within ratchet dog threaded hole 260 by looking through ratchet dog access hole 240. Moreover, by inserting position indicator 265 into ratchet dog threaded hole 260, the threads of ratchet dog threaded hole 260 may be protected.

In some embodiments, a retraction tool may be inserted through ratchet dog access hole 240 and threaded into ratchet dog threaded hole 260. Once the retraction tool is coupled with ratchet dog threaded hole 260, radial ratchet dog 210 may be manually retracted. For example, radial ratchet dog 210 and toothed insert 130 may engage to prevent decoupling once tubular members 110 and 120 are brought to a desired make-up torque. However, in some situations, tubular members 110 and 120 need to be decoupled. To retract radial ratchet dog 210 from toothed insert 130, thereby allowing tubular members 110 and 120 to decouple, the retraction tool may be inserted through ratchet dog access hole 240 and couple with radial ratchet dog 210 using radial ratchet dog threaded hole 260. By moving retraction tool radially outward, radial ratchet dog 210 may be retracted from toothed insert 130. In this manner, tubular members 110 and 120 may be uncoupled without damaging or removing toothed insert 130 or radial ratchet dogs 210.

Figure 3:
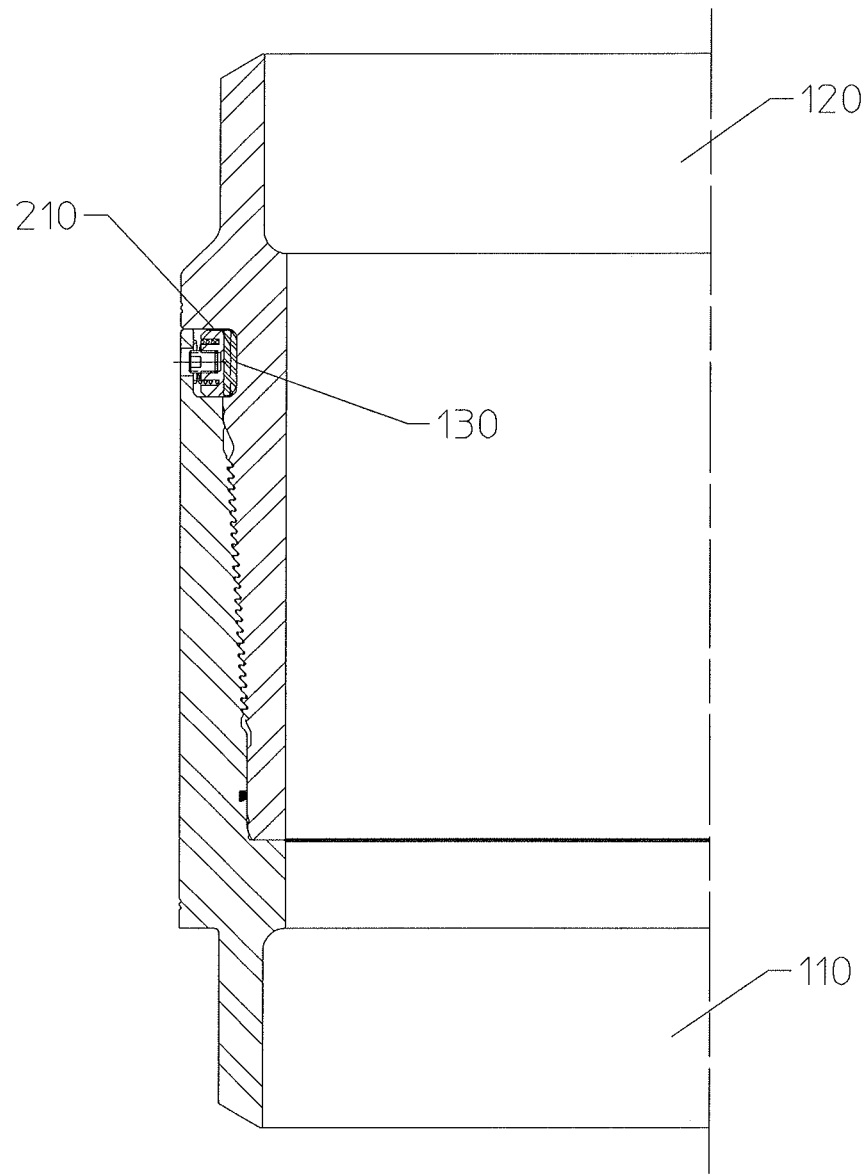
FIG. 3 illustrates a side cross sectional view of the first connector assembly comprising the first embodiment of the radial ratchet dog anti-rotation device, in accordance with an embodiment of the present disclosure.

FIG. 3 illustrates a side cross sectional view 300 of the first connector assembly comprising the first embodiment of the radial ratchet dog anti-rotation device. The first radial ratchet dog anti-rotation device may comprise radial ratchet dog 210 located in female tubular member 110 and toothed insert 130 within male tubular member 120.

As shown by cross sectional view 300, as tubular members 110 and 120 are brought to a desired make-up torque, radial ratchet dog 210 may align with toothed insert 130. Ratchet dog spring 250 may allow ratchet dog teeth 220 to move in and out of insert teeth 150 as tubular members 110 and 120 couple. Once coupled at the desired make-up torque, ratchet dog spring 250 may force radial ratchet dog 210 radially inward thereby engaging ratchet dog teeth 220 with insert teeth 150 to prevent tubular members 110 and 120 from de-coupling. In this manner, radial ratchet dog anti-rotation device automatically provides a mechanism to prevent decoupling of tubular members 110 and 120.

Figure 4A:
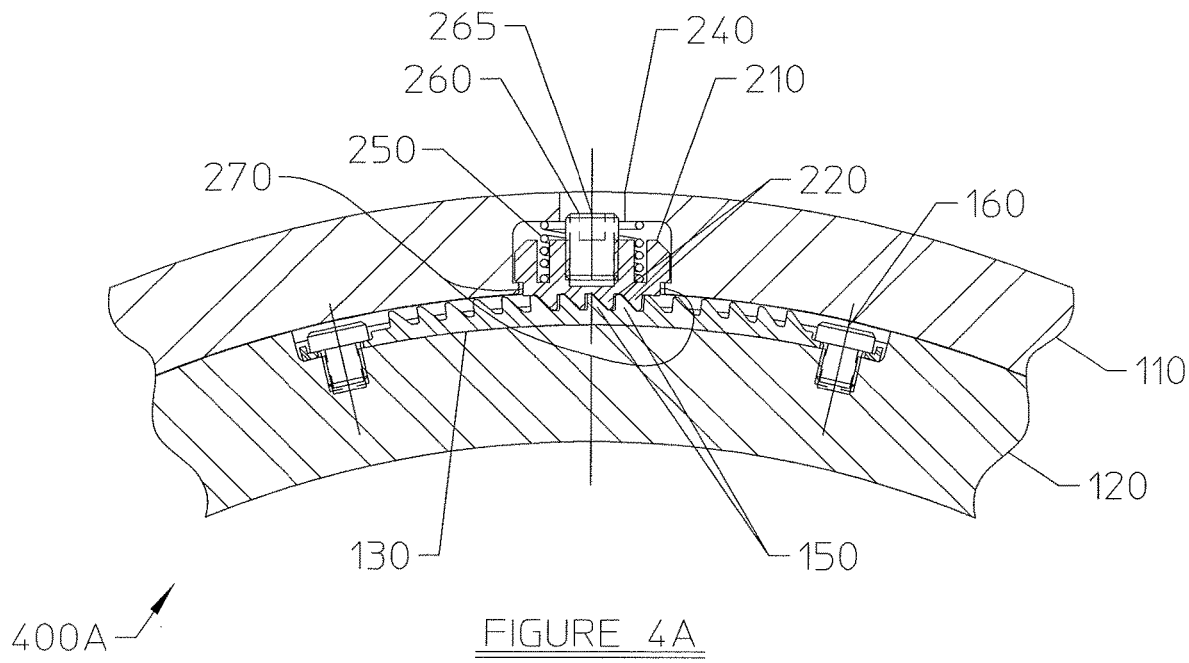
FIG. 4A illustrates a close-up, top cross-section view of the first embodiment of the radial ratchet dog anti-rotation device in an engaged position, in accordance with an embodiment of the present disclosure.
Figure 4B:
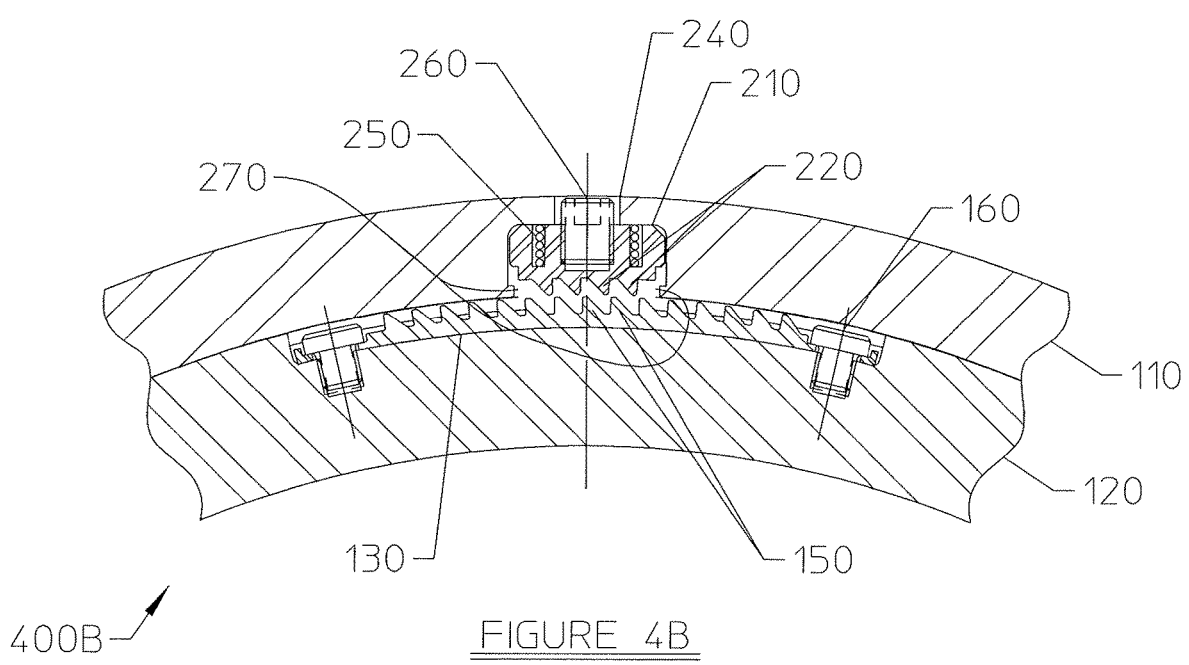
FIG. 4B illustrates a close-up, top cross-section view of the first embodiment of the radial ratchet dog anti-rotation device in a retracted position, in accordance with an embodiment of the present disclosure.

FIGS. 4A and 4B illustrate various positions of the spring loaded, radial ratchet dog anti-rotation device. FIG. 4A illustrates a close-up, top cross-section view 400A of the first embodiment of the radial ratchet dog anti-rotation device in an engaged position. As shown in the illustrated embodiment, ratchet dog spring 250 forces radial ratchet dog 210 to move in the radially inward direction, causing ratchet dog teeth 220 to engage with insert teeth 150. FIG. 4B illustrates a close-up, top cross-section view 400B of the first embodiment of the radial ratchet dog anti-rotation device in a retracted position. As shown in the illustrated embodiment, when ratchet dog teeth 220 move over insert teeth 150, ratchet dog spring 250 may compress allowing radial ratchet dog to move in the radial outward direction.

In an example embodiment, tubular members 110 and 120 may be brought to a desired make-up torque. For instance, in some embodiments, male tubular member 120 may be rotated in a clockwise direction and female tubular member 110 may be stationary or also rotated in a counter-clockwise direction. As tubular members 110 and 120 rotate, radial ratchet dog 210 may move in and out of toothed insert 130. While radial ratchet dog 210 is in the engaged position with toothed insert 130, ratchet dog teeth 220 may interact with insert teeth 150 to prevent decoupling of tubular members 110 and 120 (i.e., prevent male tubular member from rotating in the counter-clockwise direction).

As explained above, position indicator 265 may be inserted into ratchet dog threaded hole 260. When radial ratchet dog 210 is in the engaged position as shown in FIG. 4A, radial ratchet dog 210 may be biased radially inward causing position indicator 265 to also move radially inward. However, when radial ratchet dog 210 is in the retracted/disengaged position as show in FIG. 4B, radial ratchet dog 210 may be positioned radially outward, causing position indicator 265 to move radially outward. In this manner, the position of radial ratchet dog 210 may be determined by viewing the location of position indicator 265 through ratchet dog access hole 240.

In some embodiments, FIG. 4B illustrates the position of radial ratchet dog 210 when a retraction tool is used to retract radial ratchet dog 210 from toothed insert 130. For example, a retraction tool may be inserted through ratchet dog access hole 240 and threaded into ratchet dog threaded hole 260. The retraction tool may then be moved radially outward causing radial ratchet dog to move radially outward, thereby retracting from toothed insert 130. This may allow male tubular member 120 to be decoupled from female tubular member 110.

In some embodiments, ratchet dog insert slot 230 may include insert slot retention tab 270. Insert slot retention tab 270 may be designed into female tubular member 110 when ratchet dog insert slot 230 is milled or it may be added to ratchet dog insert slot 230 after milling. In the illustrated embodiment, insert slot retention tab 270 is located on the inner diameter of female tubular member 110. In some embodiments, insert slot retention tab 270 prevents radial ratchet dog 210 from overly biasing radially inward and/or prevent radial ratchet dog 210 from falling out of ratchet dog insert slot 230 when tubular members 110 and 120 are de-coupled. Insert slot retention tab 270 may be positioned such that when ratchet dog spring 250 is at its free length, radial ratchet dog 210 is pressed against insert slot retention tab 270 and ratchet dog teeth 220 extend past the inner circumference of female tubular member 110. In certain embodiments, radial ratchet dog is sized so that when radial ratchet dog 210 is in the retracted/disengaged position (i.e., FIG. 4B), ratchet dog teeth 220 do not extend past insert slot retention tab 270 or the inner circumference of female tubular member 110.

Modifications, additions, or omissions may be made to the first embodiment of the radial ratchet dog anti-rotation device without departing from the scope of the disclosure. For example, in some embodiments, radial ratchet dog 210 may be located in male tubular member 120 and toothed insert 130 may be located in female tubular member 110. Toothed insert 130 may include one or more springs allowing toothed insert 130 to move in the radial direction while radial ratchet dog 210 may be affixed using one or more fasteners. Furthermore, as explained in greater detail with respect to FIGS. 5 through 7, the design of female tubular member 110 and male tubular member 120 may allow for different layout and configurations of the radial ratchet dog anti-rotation device.

Figure 5:
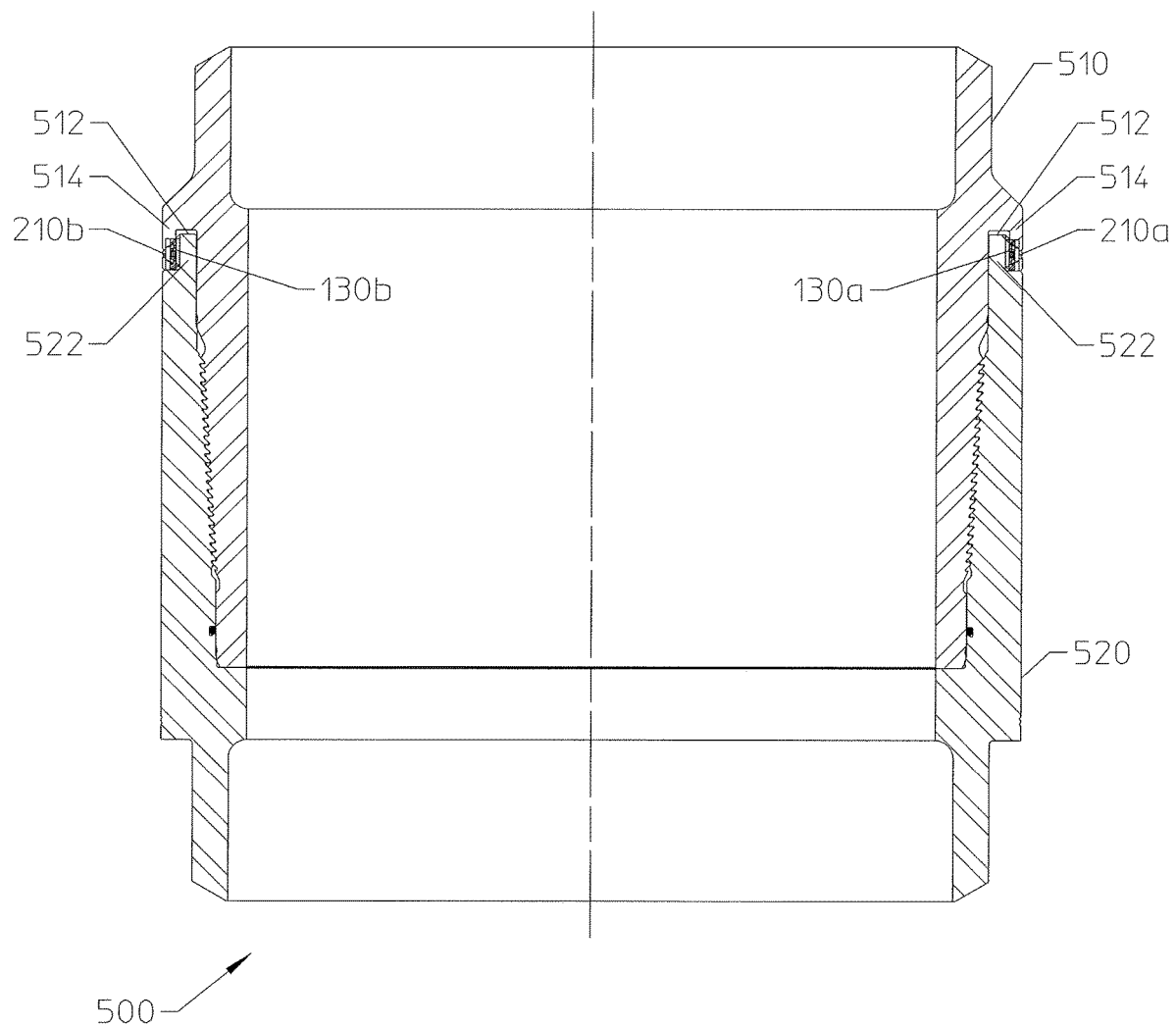
FIG. 5 illustrates a front cross sectional view of a second connector assembly comprising a second embodiment of a radial ratchet dog anti-rotation device, in accordance with an embodiment of the present disclosure.

FIG. 5 illustrates a front cross sectional view 500 of a second connector assembly comprising a second embodiment of the radial ratchet dog anti-rotation device. As explained above, pin and box connectors may take on various structures based on factors such as the application and size of the tubular members. Thus, FIG. 5 shows an additional configuration of the radial ratchet dog anti-rotation device of second connector assembly compared to the first connector assembly shown in FIG. 3. In the illustrated embodiment, a male tubular member 510 includes a groove 512 and male tubular arm 514, while a female tubular member 520 includes a tab 522. Groove 512 and tab 522 may be oriented so that tab 522 extends through grove 512 when male tubular member 510 and female tubular member 520 are coupled (male tubular member 510 and female tubular member 520 may collectively be referred to as "tubular members 510 and 520").

Similar to tubular members 110 and 120, in an example embodiment, female tubular member 520 may have internal threads, while male tubular member 510 may have external threads. In certain applications, female tubular member 520 may be referred to as the "box" and male tubular member 510 may be referred to as the "pin." The box and pin are designed to be coupled. Tubular members 510 and 520 may include, for example, lengths of a wire stem or large diameter casing. The pin may be formed into the first tubular component and the box is formed into the second tubular component, such that a connector assembly is integral to tubular components 510 and 520 being connected. In other embodiments, the pin and the box may be separate components that are attached to their respective tubular components as desired to facilitate the connection. However, the present disclosure is not limited to any specific configuration of the pin and box relative to the female tubular member 520 and the male tubular member 510 being connected.

Figure 6:
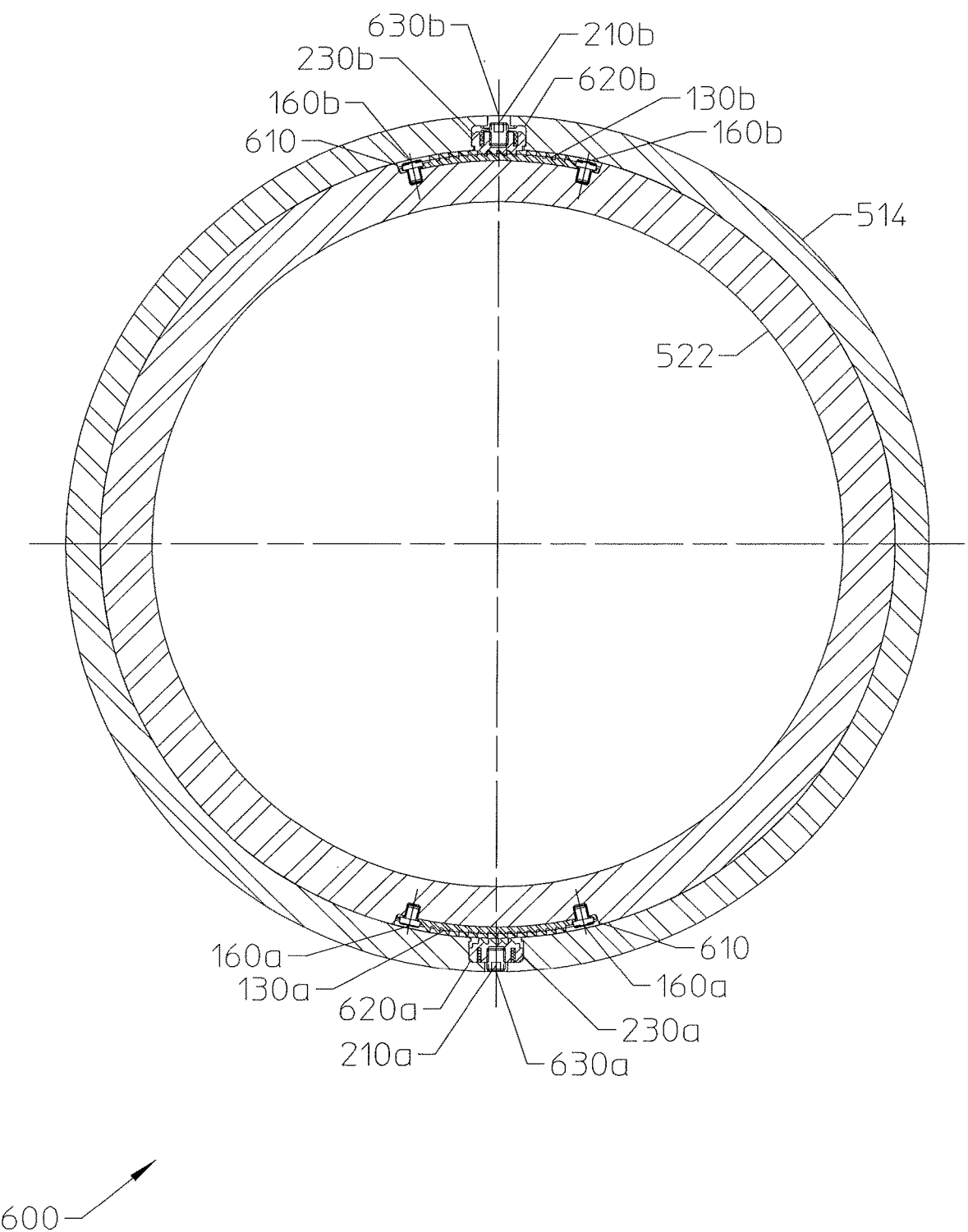
FIG. 6 illustrates a top cross sectional view of the second connector assembly comprising a second embodiment of the radial ratchet dog anti-rotation device, in accordance with an embodiment of the present disclosure.

As shown in greater detail in FIG. 6, in contrast to the first connector assembly, which positioned radial ratchet dog 210 within female tubular member 110, the second connector assembly may position radial ratchet dog 210 within male tubular member 510 and toothed insert 130 within female tubular member 520. In this manner, even though radial ratchet dog 210 is positioned within male tubular member 510, radial ratchet dog teeth 220 may still face radially inward.

FIG. 6 illustrates a top cross sectional view 600 of the second connector assembly comprising the second embodiment of the radial ratchet dog anti-rotation device. Similar to the first connector assembly, second connector assembly comprises a toothed insert 130 mechanically coupled to female tubular tab 522 of female tubular member 520 using insert fasteners 160. Toothed insert 130 may be mechanically coupled to female tubular member 520 within a female tubular recessed area 610. Radial ratchet dog 210 may be inserted into male tubular ratchet dog insert slot 620 located on the inner diameter of male tubular arm 514.

In the illustrated embodiment, toothed insert 130 may be mechanically coupled to female tubular member 520 within female tubular recessed area 610 using insert fasteners 160. In some embodiments, female tubular recessed area 610 may be located on the outer diameter of female tubular tab 522.

Male tubular arm 514 may include a male tubular ratchet dog access hole 630 through the wall of male tubular arm 514 and leading to male tubular ratchet dog insert slot 620. Male tubular ratchet dog access hole 630 may provide the same functionality as ratchet dog access hole 240 as described above with respect to the first connector assembly. For instance, radial ratchet dog 210 may be accessed via male tubular ratchet dog access hole 630. Moreover, position indicator 265 may be viewed through male tubular ratchet dog access hole 630.

In some embodiments, female tubular recessed area 610 and male tubular ratchet dog insert slot 620 may be milled into the walls of female tubular member 520 and male tubular member 510, respectively. In some embodiments, female tubular recessed area 610 and male tubular ratchet dog insert slot 620 may be milled off-site and/or included in the design of male tubular member 510 and female tubular member 520. Although FIG. 6 shows two radial ratchet dogs 210 and two toothed inserts 130, any suitable number of radial ratchet dogs 210 and toothed inserts 130 may be used to prevent tubular members 510 and 520 from decoupling.

Accordingly, the operation of radial ratchet dog anti-rotation device in the second connector assembly is analogous to the operation of radial ratchet dog anti-rotation device in the first connector assembly. For instance, as male tubular member 510 and female tubular member 520 are brought to their desired make-up torque, radial ratchet dog 210 may align with toothed insert 130. Ratchet dog spring 250 may allow ratchet dog teeth 220 to move in and out of insert teeth 150 as tubular members 510 and 520 couple. Once coupled at the desired make-up torque, ratchet dog spring 250 may force radial ratchet dog 210 radially inward thereby engaging ratchet dog teeth 220 with insert teeth 150 to prevent tubular members 510 and 520 from de-coupling. In this manner, radial ratchet dog anti-rotation device automatically provides a mechanism to prevent decoupling of tubular members 510 and 520.

Figure 7:
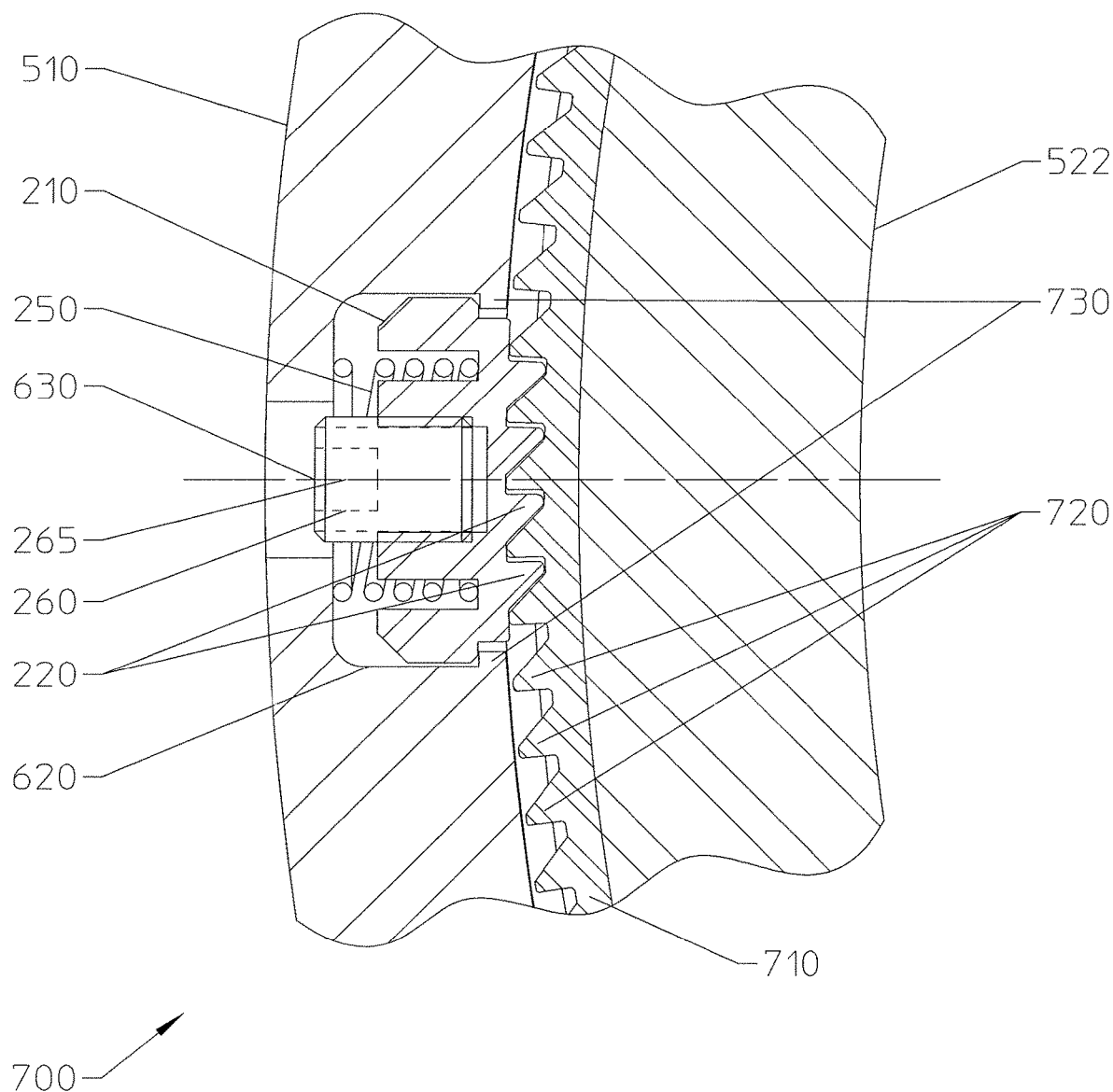
FIG. 7 illustrates a cross-section view of the second embodiment of the radial ratchet dog anti-rotation device in an engaged position, in accordance with an embodiment of the present disclosure.

FIG. 7 illustrates a top cross-section view 700 of the second embodiment of the radial ratchet dog anti-rotation device in an engaged position, according to certain embodiments. In contrast to FIG. 6, the illustrated embodiment utilizes a radially milled tooth profile 710 instead of toothed insert 130. As shown in FIG. 7, in certain embodiments, the outer diameter of female tubular tab 522 may have a radially milled tooth profile 710. Radially milled tooth profile 710 may comprise a plurality of radially milled teeth 720.

In certain embodiments, radially milled tooth profile 710 may extend around the entire circumference of female tubular tab 522. In some embodiments, radially milled tooth profile 710 extends around a portion of female tubular tab 522.

Ratchet dog teeth 220 and radially milled teeth 720 of radially milled tooth profile 710 may have a matching circumferential tooth profile with an angled leading edge that allows radial ratchet dog 210 to move radially outward when tubular members 510 and 520 are being coupled and a flat or substantially flat lagging edge that allows radial ratchet dog 210 to engage radially milled teeth 720 and resist un-buck toque between tubular members 510 and 520.

The operation of radial ratchet dog anti-rotation device having a radially milled tooth profile 710 may be similar to the operation of radial ratchet dog anti-rotation device utilizing toothed insert 130. For example, male tubular member 510 and female tubular member 520 may be brought to their make-up torque. As tubular members 510 and 520 couple together, radial ratchet dog 210 may begin to ratchet over radially milled tooth profile 710. Ratchet dog spring 250 may compress to allow ratchet dog teeth 220 to move in and out of radially milled teeth 720 as tubular members 510 and 520 couple. Once coupled at the desired make-up torque, ratchet dog spring 250 may force radial ratchet dog 210 radially inward thereby engaging ratchet dog teeth 220 with radially milled teeth 720 to prevent tubular members 510 and 520 from decoupling. In this manner, radial ratchet dog anti-rotation device automatically provides a mechanism to prevent decoupling of tubular members 510 and 520.

To decouple tubular members 510 and 520, a retraction tool may be used to retract radial ratchet dog 210 from radially milled tooth profile 710. For example, a retraction tool may be inserted through male tubular ratchet dog access hole 630 and threaded into ratchet dog threaded hole 260. The retraction tool may then be moved radially outward causing radial ratchet dog to move radially outward, thereby retracting from radially milled tooth profile 710. This may allow male tubular member 510 to be decoupled from female tubular member 520.

In some embodiments, similar to insert slot retention tab 270, male tubular ratchet dog insert slot 620 may include male tubular insert slot retention tab 730. Male tubular insert slot retention tab 730 may be designed into male tubular arm 514 when male tubular ratchet dog insert slot 620 is milled or it may be added to male tubular ratchet dog insert slot 620 after milling.

In the illustrated embodiment, male tubular insert slot retention tab 730 is located on the inner diameter of male tubular arm 514. In some embodiments, male tubular insert slot retention tab 730 prevents radial ratchet dog 210 from overly biasing radially inward and/or prevents radial ratchet dog 210 from falling out of male tubular ratchet dog insert slot 620 when tubular members 510 and 520 are de-coupled. Male tubular insert slot retention tab 730 may be designed such that when ratchet dog spring 250 is at its free length, radial ratchet dog 210 is pressed against male tubular insert slot retention tab 730 and ratchet dog teeth 220 extend past the inner circumference of male tubular arm 514. In certain embodiments, radial ratchet dog 210 is sized such that when radial ratchet dog 210 is in the retracted/disengaged position, ratchet dog teeth 220 do not extend past insert male tubular insert slot retention tab 730 or the inner circumference of male tubular arm 514.

Modifications, additions, or omissions may be made to the system illustrated as the second connector assembly without departing from the scope of the disclosure. For example, in some embodiments, radially milled tooth profile 710 may be used in first connector assembly as part of the outer diameter of male tubular member 120. Thus, instead of using radial recessed area 140 within male tubular member 120, radially milled tooth profile 710 may be used to engage radial ratchet dog 210 located within ratchet dog insert slot 230.

Figure 8:
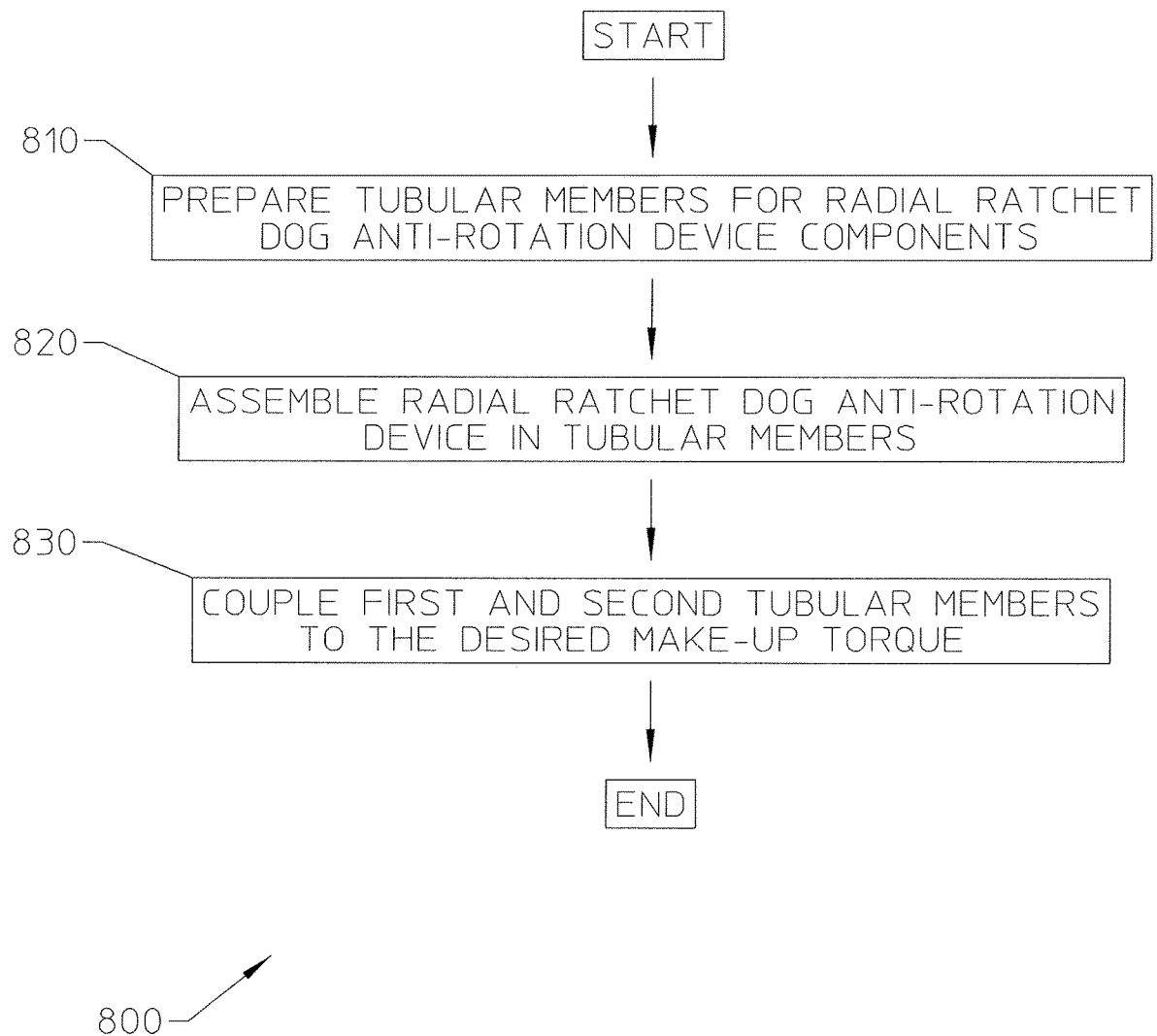
FIG. 8 illustrates a method for securely coupling tubular members using a radial ratchet dog anti-rotation device, in accordance with an embodiment of the present disclosure.

FIG. 8 illustrates a method 800 for securely coupling tubular members using a radial ratchet dog anti-rotation device. At step 810, the tubular members are prepared for the radial ratchet dog anti-rotation device components. Preparation of the tubular members may depend on a number of factors, including the configuration of tubular connectors and whether toothed insert 130 or radially milled tooth profile 710 is used.

If radial ratchet dog 210 is implemented within female tubular member 110, the inner circumference of female tubular member 110 may be milled to create ratchet dog insert slot 230 located in the inner circumference of female tubular member 110. In some embodiments, ratchet dog access hole 240 may also be drilled through the wall of female tubular member 110 and into ratchet dog insert slot 230. Furthermore, male tubular member 120 may be milled to create radial recessed area 140. In some embodiments, radial recessed area 140 may be located axially between an external thread of male tubular member 120 and the torque shoulder of male tubular member 120.

If radial ratchet dog 210 is implemented within male tubular arm 514, the inner circumference of male tubular aim 514 may be milled to create male tubular ratchet dog insert slot 620. In some embodiments, male tubular ratchet dog access hole 630 may be drilled through the wall of male tubular arm 514 and into male tubular ratchet dog insert slot 620. Furthermore, female tubular tab 522 may be milled to create female tubular recessed area 610.

At step 820, the radial ratchet dog anti-rotation device may be assembled in the tubular members (e.g., 110 and 120 or 510 and 520). For example, to assemble radial ratchet dog anti-rotation device within tubular members 110 and 120, radial ratchet dog 210 may be inserted into ratchet dog insert slot 230. Toothed insert 130 may be fastened to radial recessed area 140 of male tubular member 120 using insert fasteners 160. For example, in some embodiments insert fasteners 160 may be threaded bolts that are threaded into tapped holes within male tubular member 120 (e.g., low head cap screws).

To assemble radial ratchet dog 210 within tubular members 510 and 520, radial ratchet dog 210 may be inserted into male tubular ratchet dog insert slot 620. Toothed insert 130 may be fastened to female tubular recessed area 610 in female tubular tab 522. Similar to the assembly of radial ratchet dog 210 within tubular members 110 and 120, toothed insert 130 may utilize insert fasteners 160 (e.g., a threaded bolt) to mechanically couple to female tubular recessed area 610.

In some embodiments, one or more toothed inserts 130 may be replaced by radially milled tooth profile 710. For example, radially milled tooth profile 710 may be milled around the circumference of female tubular tab 522 to engage ratchet dog teeth 220. In some embodiments, radially milled teeth 720 of radially milled tooth profile 710 may be milled to have a matching circumferential tooth profile with ratchet dog teeth 220. For example, radially milled teeth 72 and ratchet dog teeth 220 may have an angled leading edge that allows radial ratchet dog 210 to move radially outward when tubular members 510 and 520 are being coupled and a flat or substantially flat lagging edge that allows radial ratchet dog 210 to engage radially milled teeth 720 and resist un-buck toque between tubular members 510 and 520.

At step 830, tubular members (e.g. 110 and 120 or 510 and 520) may be coupled to a desired make-up torque. The desired make-up torque of the tubular members may depend on a number of factors including the application of the tubular members, the material used to create the tubular members, and the design of the tubular members.

For example, as tubular members 110 and 120 are being coupled to the desired make-up torque, the first embodiment of the radial ratchet dog anti-rotation device may automatically engage to prevent female tubular member 110 and male tubular member 120 from decoupling. In some embodiments, as tubular members 110 and 120 are brought to a desired make-up torque, radial ratchet dog 210 may align with toothed insert 130. Ratchet dog spring 250 may allow ratchet dog teeth 220 to move in and out of insert teeth 150 as tubular members 110 and 120 couple. Once coupled to the desired make-up torque, ratchet dog spring 250 may force radial ratchet dog 210 radially inward thereby engaging ratchet dog teeth 220 with insert teeth 150 to prevent tubular members 110 and 120 from de-coupling. In this manner, radial ratchet dog anti-rotation device automatically provides a mechanism to prevent decoupling of tubular members 110 and 120.

As another example, radial ratchet dog anti-rotation device may automatically engage to prevent male tubular member 510 and female tubular member 520 from decoupling when they reach a desired make-up torque. As female tubular tab 522 rotates around male tubular member 510 within male tubular groove 512, radial ratchet dog 210 may align with toothed insert 130. Ratchet dog spring 250 may allow ratchet dog teeth 220 to move in and out of insert teeth 150 as tubular members 510 and 520 couple. Once coupled to the desired make-up torque, ratchet dog spring 250 may force radial ratchet dog 210 radially inward thereby engaging ratchet dog teeth 220 with insert teeth 150 to prevent tubular members 510 and 520 from de-coupling. In this manner, radial ratchet dog anti-rotation device automatically provides a mechanism to prevent decoupling of tubular members 510 and 520.

Various embodiments may perform some, all, or none of the steps described above. For example, in certain embodiments, tubular members 110 and 120 may be prepared off-site so that the tubular members 110 and 120 do not need to be prepared on location. Moreover, one or more steps may be repeated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure. Embodiments of the present disclosure are best understood by referring to FIGS. 1 through 8, where like numbers are used to indicate like and corresponding parts.

What is claimed is:

1. A system, comprising:
a first tubular member having an extended thread and a torque shoulder, the first tubular member comprising a radial recessed area, the radial recessed area located axially between the external thread and the torque shoulder of the first tubular member;
a second tubular member comprising a radial recessed slot, the radial recessed slot located at an inner circumference of the second tubular member and extending partially and not completely through a radial wall thickness of the second tubular member towards an outer circumference of the second tubular member such that the second tubular member forms a radially external wall around the radial recessed slot, wherein the radially external wall comprises a pair of sidewalls coupled to an inner wall, wherein the inner wall is disposed between the inner circumference of the second tubular member and the outer circumference of the second tubular member, wherein the radially external wall is a unitary structure with the second tubular member and extends in an axial direction with respect to a longitudinal axis of the second tubular member from a first axial end of the radial recessed slot to a second axial end of the radial recessed slot;
a pin toothed insert mechanically coupled to the first tubular member within the recessed area, the pin toothed insert comprising a first circumferential tooth pattern facing radially outward from the first tubular member;
a spring loaded, radial ratchet dog that is separate from the second tubular member and located within the radial recessed slot, the spring loaded, radial ratchet dog comprising a second circumferential tooth pattern facing radially inward from the second tubular member, wherein a spring of the spring loaded, radial ratchet dog biases the spring loaded, radial ratchet dog in a radial direction with respect to the second tubular member within the radial recessed slot against the inner wall of the radially external wall;
the spring loaded, radial ratchet dog movable radially outward over the pin toothed insert during coupling of the first tubular member and the second tubular member; and
the spring loaded, radial ratchet dog engaging the pin toothed insert and resisting decoupling of the first tubular member and the second tubular member.

2. The system of claim 1, wherein:
the second tubular member further comprises a thru hole extending entirely through the radially external wall for accessing the spring loaded, radial ratchet dog; and
the spring loaded, radial ratchet dog further comprises a threaded hole located opposite of the second circumferential tooth pattern on a backside of the spring loaded, radial ratchet dog.

3. The system of claim 2, wherein the spring loaded, radial ratchet dog further comprises a position indicator inserted into the threaded hole of the spring loaded, radial ratchet dog, the position indicator configured to indicate the radial position of the spring loaded, radial ratchet dog using the thru hole.

4. The system of claim 2, wherein the threaded hole of the spring loaded, radial ratchet dog is configured to receive a retraction tool inserted through the thru hole in the second tubular member, the retraction tool configured to retract the spring loaded, radial ratchet dog from the pin toothed insert.

5. The system of claim 1, wherein the radial recessed slot of the second tubular member further comprises a retention tab located on the inner circumference of the radial recessed slot and configured to prevent the spring loaded, radial ratchet dog from biasing radially inward and to prevent the spring loaded, radial ratchet dog from falling out of the radial recessed slot when the first and second tubular members are de-coupled.

6. The system of claim 2, wherein the thru hole has a circular cross section that has a constant diameter along an entire radial length through which the thru hole extends through the radially external wall.

7. The system of claim 1, wherein the first and second circumferential tooth patterns have a matching circumferential tooth profile comprising an angled leading edge and a flat lagging edge.

8. The system of claim 1, wherein the first tubular member is a male pin connector and the second tubular is a female box connector.

9. The system of claim 1, wherein the pin toothed insert is removably coupled to the first tubular member, wherein the pin toothed insert is replaceable.

10. The system of claim 1, wherein the pin toothed insert is removably coupled to the first tubular member via threaded bolts extending through the pin toothed insert and threaded into tapped holes within the first tubular member.

11. The system of claim 1, wherein the pin toothed insert comprises a circumferential length that does not extend fully around a circumference of the first tubular member.

12. The system of claim 11, wherein the circumferential length of the pin toothed insert corresponds to a make-up torque tolerance of the first and second tubular members to ensure that the spring loaded, radial ratchet dog falls on the pin toothed insert at both a minimum and maximum make-up torque.

13. The system of claim 11, further comprising:
a second radial recessed area of the first tubular member, the second radial recessed area located axially between the external thread and the torque shoulder of the first tubular member, wherein the radial recessed area and the second radial recess area are at different circumferential positions about the first tubular member;
a second radial recessed slot of the second tubular member, the second radial recessed slot located in an inner circumference of the second tubular member and extending partially through a radial wall thickness of the second tubular member such that the second tubular member forms a radially external wall around the second radial recessed slot;
a second pin toothed insert mechanically coupled to the first tubular member within the second recessed area, the second pin toothed insert comprising the first circumferential tooth pattern facing radially outward from the first tubular member; and
a second spring loaded, radial ratchet dog that is separate from the second tubular member and located within the second radial recessed slot, the second spring loaded, radial ratchet dog comprising the second circumferential tooth pattern facing radially inward from the second tubular member;
the second spring loaded, radial ratchet dog being movable radially outward over the second pin toothed insert during coupling of the first tubular member and the second tubular member; and
the second spring loaded, radial ratchet dogs engaging the second pin toothed insert and resisting decoupling of the first tubular member and the second tubular member.

14. A method for securely coupling tubular members, the method comprising:
preparing a first tubular member and a second tubular member to receive a radial ratchet dog anti-rotation device, wherein preparing the first tubular member and the second tubular member comprises:
forming a radial recessed area within the first tubular member, the radial recessed area located axially between an external thread and a torque shoulder of the first tubular member; and
forming a radial recessed slot within the second tubular member, the radial recessed slot located at an inner circumference of the second tubular member and extending partially and not completely through a radial wall thickness of the second tubular member towards an outer circumference of the second tubular member such that the second tubular member forms a radially external wall around the radial recessed slot, wherein the radially external wall comprises a pair of sidewalls coupled to an inner wall, wherein the inner wall is disposed between the inner circumference of the second tubular member and the outer circumference of the second tubular member, wherein the radially external wall is a unitary structure with the second tubular member and extends in an axial direction with respect to a longitudinal axis of the second tubular member from a first axial end of the radial recessed slot to a second axial end of the radial recessed slot;
assembling the radial ratchet dog anti-rotation device, wherein assembling the radial ratchet dog anti-rotation device comprises:
disposing a pin toothed insert to the first tubular member within the recessed area, the pin toothed insert comprising a first circumferential tooth pattern facing radially outward from the first tubular member; and
disposing a spring loaded, radial ratchet dog that is separate from the second tubular member within the radial recessed slot, the spring loaded, radial ratchet dog comprising a second circumferential tooth pattern facing radially inward from the second tubular member; and
coupling the first tubular member and the second tubular member, wherein during coupling the spring loaded, radial ratchet dog is movable radially outward over the pin toothed insert during and the spring loaded, radial ratchet dog engages the pin toothed insert and resists decoupling of the first tubular member and the second tubular member, wherein a spring of the spring loaded, radial ratchet dog biases the spring loaded, radial ratchet dog in a radial direction with respect to the second tubular member within the radial recessed slot against the inner wall of the radially external wall.

15. The method of claim 14, wherein the second tubular member further comprises a thru hole extending entirely through the radially external wall for accessing the spring loaded, radial ratchet dog; and
the spring loaded, radial ratchet dog further comprises a threaded hole located opposite of the second circumferential tooth pattern on a backside of the spring loaded, radial ratchet dog.

16. The method of claim 15, further comprising:
inserting a position indicator into the threaded hole of the spring loaded, radial ratchet dog, the position indicator configured to indicate the radial position of the spring loaded, radial ratchet dog using the thru hole.

17. A radial ratchet dog anti-rotation device, comprising:
a toothed insert mechanically coupled to a radial recessed area of a first tubular member, the radial recessed area located axially between an external thread and a torque shoulder of the first tubular member, wherein the pin toothed insert comprises a first circumferential tooth pattern facing radially outward from the first tubular member;
a spring loaded, radial ratchet dog located within a radial recessed slot of a second tubular member that is separate from the spring loaded, radial ratchet dog, the radial recessed slot located at an inner circumference of the second tubular member and extending partially and not completely through a radial wall thickness of the second tubular member towards an outer circumference of the second tubular member such that the second tubular member forms a radially external wall around the radial recessed slot, wherein the radially external wall comprises a pair of sidewalls coupled to an inner wall, wherein the inner wall is disposed between the inner circumference of the second tubular member and the outer circumference of the second tubular member, wherein the radially external wall is a unitary structure with the second tubular member and extends in an axial direction with respect to a longitudinal axis of the second tubular member from a first axial end of the radial recessed slot to a second axial end of the radial recessed slot, wherein the spring loaded, radial ratchet dog comprises a second circumferential tooth pattern facing radially inward from the second tubular member, wherein a spring of the spring loaded, radial ratchet dog biases the spring loaded, radial ratchet dog in a radial direction with respect to the second tubular member within the radial recessed slot against the inner wall of the radially external wall;

the spring loaded, radial ratchet dog movable radially outward over the pin toothed insert during coupling of the first tubular member and the second tubular member; and the spring loaded, radial ratchet dog engaging the pin toothed insert and resisting decoupling of the first tubular member and the second tubular member.

18. The radial ratchet dog anti-rotation device of claim 17, wherein:

the second tubular member further comprises a thru hole extending entirely through the radially external wall for accessing the spring loaded, radial ratchet dog; and the spring loaded, radial ratchet dog further comprises a threaded hole located opposite of the second circumferential tooth pattern on a backside of the spring loaded, radial ratchet dog.

19. The radial ratchet dog anti-rotation device of claim 18, wherein the spring loaded, radial ratchet dog further comprises a position indicator inserted into the threaded hole of the spring loaded, radial ratchet dog, the position indicator configured to indicate the radial position of the spring loaded, radial ratchet dog using the thru hole.

20. The radial ratchet dog anti-rotation device of claim 18, wherein the threaded hole of the spring loaded, radial ratchet dog is configured to receive a retraction tool inserted through the thru hole in the second tubular member, the retraction tool configured to retract the spring loaded, radial ratchet dog from the pin toothed insert.

* * * * *